United States Patent
Hoeffleur

[15] 3,685,663
[45] Aug. 22, 1972

[54] CLAMP

[72] Inventor: Albert Hoeffleur, Alte Landstrasse 29, CH-8700 Kusnacht, Switzerland

[22] Filed: June 23, 1970

[21] Appl. No.: 49,018

[30] Foreign Application Priority Data

July 3, 1969 Switzerland............. 10157/69

[52] U.S. Cl. .................... 211/107, 248/221, 248/231
[51] Int. Cl. ............................................. F16m 13/02
[58] Field of Search..248/125, 221, 226 R, 230, 231, 248/295, 296; 24/17 A, 20, 27, 255 SL, 255 C, 261 C; 211/107, 112; 47/47

[56] References Cited

UNITED STATES PATENTS 3,302,328    2/1967    King ............................. 47/47
1,053,126    2/1913    Fuller et al .................. 24/17 X
3,043,547    7/1962    Reich ....................... 24/237 X
1,402,153    1/1922    Dunberre .................... 24/259

FOREIGN PATENTS OR APPLICATIONS 481,376    3/1938    Great Britain ................ 47/47
101,088    11/1897    Germany ..................... 47/47

*Primary Examiner*—William H. Schultz
*Attorney*—Watson, Cole, Grindle & Watson

[57] ABSTRACT

A clamp adapted to be fixed to a rod-like member for use as a bracket or hanger and comprising a substantially U-shaped spring steel band having a curved middle portion and two intersecting arms each having a hook at its end, and means forming a connection between the cross-over point of the arms.

5 Claims, 1 Drawing Figure

PATENTED AUG 22 1972　　　　　　　　　　　　　　3,685,663
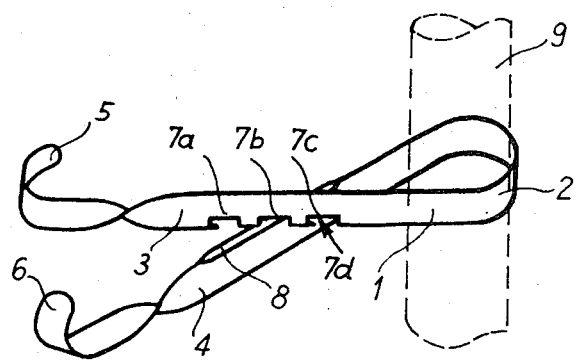
INVENTOR.
Albert Hoeffleur
BY
Watson, Cole, Grindle & Watson
Att.ys.

CLAMP

The invention relates to a clamp which may be fixed to any tubular member, for use as a bracket or hanger.

Heretofore, pipe clips have been used for the purpose of securing articles to pipes or poles, as by hanging, such clips being in the form of metal bands fitted about the pipe or pole and clamped together by bolting. Because of the bolted connection needed for clamping it firmly, however, fitting such a pipe clip to a pipe is awkward. Moreover, the pipe clip is generally suitable only for pipes of a particular diameter. For securing or hanging articles only temporarily in this way, therefore — for hanging articles on tent poles, for example — pipe clips are not very suitable.

Accordingly, the present invention is designed to provide a clamp of the type above referred to wherein it is possible for articles to be secured to, and more particularly hung on, pipes or poles, without any bolted connection having to be made for fixing the clamp to the pipe or pole while, nevertheless, ensuring that the clamp and its attachment to the pipe are strong enough to enable even heavy objects to be attached to or hung on the clamp. It is also thereby possible to fix the clamp to pipes of various diameters.

This is achieved with the use of a clamp of the type above referred to, consisting of a band of spring steel which, in its unstressed state, is substantially U-shaped, its curved middle portion extending into two arms, which are looped about the tubular object in opposition to its own springiness, one arm being crossed over the other, the spring-steel band being provided with stops or catches along one edge of one arm and along the other edge of the other arm so as to form a connection between the arms at their crossover point, the connection being held together by the springiness of the steel band and released when that springiness is overcome.

The stops or catches may well take the form of a number of openings in one edge of one arm of the steel band, into which the other edge of the other arm of the steel band can be fitted. These means whereby one arm is caught to the other may advantageously also include a bent-over portion along the said other edge of the other arm of the steel band, in which case, the said openings should be notched, each in the same direction, so that the said bent-over portion may be slipped into one or other of the notches. The bent-over portion may well be set, for example, at right angles to the plane of the steel band within that portion, the notches then being in the form of slots starting within the openings and extending substantially parallel to the said one edge of the steel band, their width preferably approximating the thickness of the band.

In one recommended form of such clamp, several openings in succession are provided along the one edge of one arm of the steel band, to enable the clamp to be fixed to tubular members of various diameters.

The ends of the arms of the band may be provided with means such as hooks, eyes or the like, for attaching or hanging articles. For this purpose, the ends of the arms may be twisted through at least approximately 90° and terminated so as to form hooks. The particular advantage of this is that the clamp with its hook-ended arms is thus given great mechanical strength.

When the clamp is intended to serve as a hangar and is designed to be fixed to a tubular member extending vertically or obliquely, it is desirable that the hooked ends of the arms should be bent over in the same direction and that the openings referred to should be provided along that edge of the steel band which faces away from the direction in which the hooked ends are bent, so that the stresses produced by articles hung on the clamp, or by the load which they represent, will tend not to make the openings wider, but to close them up; stresses tending to make the openings wider might result, in the case of very heavy loads, in fracturing the clamp at the opening concerned, because of notch sensitivity.

The invention is described in detail hereafter, in conjunction with the accompanying drawing of one example thereof.

The clamp illustrated consists of a band of spring steel, 1, having a curved middle portion, 2, with two arms, 3 and 4, running from the ends of the curved portion 2. The ends of the arms 3 and 4 are each twisted through 90° and terminate in hooks 5 and 6 bent upwards. The lower edge of the arm 3 has several openings, 7a, 7b and 7c, all of the same shape and each extending into a slot (such as 7d), which starts from the opening and runs substantially parallel to the edges of the arm 3. The width of these slots is about equal to the thickness of the steel band 1. There is also a portion, 8, bent over at right angles from the top edge of the arm 4, so that this bent-over portion 8 of the arm 4 can be slipped into the slots (such as 7d) extending from the openings 7a, 7b and 7c. Thus, the slotted openings in the arm 3 form catches for the bent-over portion of the arm 4, enabling the arms 3 and 4 to be joined together at their crossover-point.

With the arms 3 and 4 in the position shown in the drawing, the band of spring steel 1 is in the stressed state, the resultant spring action serving to force the bent-over portion 8 into the slot running from the opening 7b. The arms 3 and 4 are thus securely held at their crossover-point. To release this connection, the ends of the arms 3 and 4 must be pulled apart, first horizontally and then vertically. The connection having thus been released, the band of spring steel becomes unstressed and the clamp is substantially U-shaped. To fit the clamp to a pipe or pole – to the pole 9, for example, drawn in broken lines – the clamp, with its arms 3 and 4 not joined together, so that the steel band is unstressed, is passed about the pole 9 and the arms 3 and 4 are then, as shown in the drawing, crossed over each other and their ends pulled horizontally apart until the curved portion of the band 1 fits as closely as possible to the pole 9, whereupon the bent-over edge 8 is slipped into the slot running from the nearest opening (the opening 7b, in the present instance). The clamp is thus secured to the pole.

The arrangement of the openings 7a, 7b and 7c along the lower edge of the arm 3 has the advantage that those openings, when placed under load, are not widened, but forced together. Similarly, the arrangement of the bent-over portion 8 on the top edge of the arm 4 has the advantage that the load-bearing capacity of the arm 4 is thereby increased and the risk of breakage of the arm 4 as a result of notch sensitivity in its top edge is to all intents and purposes excluded.

The clamp here proposed is very suitable, in particular, as a tent accessory or as an item of camping equip-

What I claim is:

1. A clamp, for use as a bracket or hanger, adapted to be fixed about a tubular member, comprising a substantially U-shaped band of flat spring steel having a curved middle portion, a plurality of openings in one edge of one arm of said band, a bent-over portion along the edge of the other arm of said band facing said one edge, one side of each said opening having a notch with which said bent-over portion cooperates for interengagement during a crossover of said arms so that said middle portion may snugly engage the tubular member while the clamp is looped thereabout, said cooperating bent-over portion and notches serving to lock said arms together in their crossover condition under the influence of the springiness of said band, and said arms being disengageable when the band springiness is overcome.

2. A clamp as claimed in claim 1, in which the bent-over portion (8) is disposed at right angles to the plane of the steel band within that portion, the notches being in the form of slots (7d) starting within the openings (7a, 7b and 7c) and extending substantially parallel to said one edge of the steel band (1), their width approximating the thickness of the band (1).

3. A clamp as claimed in claim 1, in which the free ends of the arms of the steel band (1) are provided with means (5 and 6) on which articles may be hung.

4. A clamp as claimed in claim 1, in which the free ends of the arms of the steel band (1) are each provided with hooks (5 and 6) defined by bent portions of said arms along with twisted portions through at least 90° therealong near said free ends.

5. A clamp as claimed in claim 4, in which the hooked ends (5 and 6) arms are defined by being bent over in the same direction and the (7a, 7b and 7c) are provided along that edge of the steel band (1) which faces away from the direction in which the hooked ends (5 and 6) are bent.

* * * * *